United States Patent [19]

Sato et al.

[11] Patent Number: 5,038,885
[45] Date of Patent: Aug. 13, 1991

[54] FOUR-WHEEL DRIVE WORK VEHICLE

[75] Inventors: Fumiki Sato; Hirofumi Iritani, both of Saikai, Japan

[73] Assignee: Kubota, Ltd., Osaka, Japan

[21] Appl. No.: 350,615

[22] Filed: May 11, 1989

[30] Foreign Application Priority Data

May 31, 1988 [JP] Japan ................... 63-134817
Jul. 1, 1988 [JP] Japan ................... 63-165458

[51] Int. Cl.⁵ ............................................ B60K 17/352
[52] U.S. Cl. ................................. 180/247; 180/248; 180/338; 74/337.5
[58] Field of Search ............... 180/233, 247, 248, 337, 180/338; 74/335, 337.5

[56] References Cited

U.S. PATENT DOCUMENTS 4,290,318 9/1981 Ookubo et al. ................. 180/247
4,723,622 2/1988 Toshikuni et al. .............. 180/233
4,723,623 2/1988 Teraoka et al. ................. 180/233

FOREIGN PATENT DOCUMENTS 2181395 4/1987 United Kingdom ............... 180/233

Primary Examiner—Charles A. Marmor
Assistant Examiner—Mitchell Bompey
Attorney, Agent, or Firm—Cushman, Darby & Cushman

[57] ABSTRACT

In a four-wheel drive work vehicle selectively drivable in a standard four-wheel drive mode, an accelerated four-wheel drive mode and in a two-wheel drive mode, the invention provides an improved drive-mode switching operability through a linearly operable link mechanism for operatively connecting one operational system for directly operating a shift fork member with another operational system for operating the same via a cam member connected to a steering wheel.

3 Claims, 7 Drawing Sheets

FOUR-WHEEL DRIVE WORK VEHICLE

BACKGROUND OF THE INVENTION

1. Field of the Invention

The present invention relates to a four-wheel drive work vehicle selectively drivable in a standard four-wheel drive mode for driving front wheels and rear wheels at a substantially same speed, an accelerated four-wheel drive mode for driving the front wheels at a higher speed than the rear wheels when the front wheels are steered beyond a predetermined angle or in a two-wheel drive mode for driving only the rear wheels while breaking the power transmission to the front wheels.

2. Description of the Prior Art

An agricultural tractor as one example of the above-described four-wheel drive work vehicle is known from e.g. a Japanese patent laid open under Showa: No. 63-34229 (U.S. Pat. Ser. No. 4,723,623). This agricultural tractor is drivable in the three drive modes: the two-wheel drive mode where only the rear wheels are driven, the standard four-wheel drive mode where the front wheels and the rear wheels are constantly driven at substantially the same speed and the accelerated four-wheel drive mode where the front wheels are driven at a higher speed than the rear wheels when the front wheels are steered beyond a predetermined angle.

More specifically, the two-wheel drive mode and the standard four-wheel drive mode are selected other through a forward-reverse pivotal operation on a mode-switch lever; whereas, the standard four-wheel drive mode and the accelerated four-wheel drive mode are selected through an up-down pivotal operation of the mode-switch lever. Accordingly, if a driver desires to change the vehicle drive mode from the two-wheel drive mode to the accelerated four-wheel drive mode, he must operate the mode-switch lever in two directions successively; namely, operating the lever in the forward-reverse direction and then in the up-down direction. That is to say, in this prior art, the 3-mode switching operation requires two steps of successive operations of the switch lever in the two different directions. This inconvenience has significantly impaired the drivability of the work vehicle.

The present invention attends to such inconvenience and aims at improvement of the drivability, i.e. the drive-mode switching operability of the work vehicle.

SUMMARY OF THE INVENTION

In order to accomplish the above-noted object, in a four-wheel drive work vehicle having a front-wheel change speed apparatus selectively switchable by a sliding operation of a shift member to provide a standard four-wheel drive mode for driving front wheels and rear-wheels at a substantially same speed, an accelerated four-wheel drive mode for driving the front wheels at a higher speed than the rear wheels when the front wheels are steered beyond a predetermined angle or a two-wheel drive mode for driving only the rear wheels while breaking the power transmission to the front wheels, according to the invention, the front-wheel change speed apparatus includes: a shift fork member operatively connected to the shift member and constantly biased towards a standard four-wheel drive position, the shift fork member being linearly shiftable from the four-wheel drive position to a two-wheel drive position or to an accelerated four-wheel drive position; a cam member operatively connected to a steering wheel and having an operational face formed along the sliding direction of the shift fork member, the cam member being operable into an operable position for selectively pushing the shift fork member from the standard four-wheel drive position to the accelerated four-wheel drive position and into an inoperative position free from the connection to the shift fork member; and a link mechanism switchable into a first operational condition for bringing the cam member into the operative position, a second operational condition for bringing the cam member into the inoperative position and a third operational condition for bringing the cam member into the inoperative position and the shift fork member into the two-wheel drive position respectively. Functions and effects of this construction will be described next.

According to the above construction, the shift member 14 for determining the drive mode is operatively connected to the shift fork member 17 which is constantly urged towards the standard four-wheel drive position and is linearly shifted therefrom into the two-wheel drive position or into the accelerated four-wheel drive position when desired. Further, the positioning, i.e. shifting operation of the shift fork member 17 is effected either directly, or indirectly via the cam member 22 in order to obtain a drive mode corresponding to the steering amount of the front wheels (i.e. to obtain the accelerated four-wheel drive mode for driving the front wheels in acceleration relative to the rear wheels when the steering amount has exceeded the predetermined value). That is to say, the shift fork member 17 is shifted by two independent operational links. Also, the cam member 22 is operatively connected to the steering wheel so as to be pivoted in connection with a steering amount by the steering wheel 22 of the front wheels, and the cam member 22 is selectively operable into the operative position for shifting the shift fork member 17 and into the inoperative position free from the connection with the fork member 17.

Moreover, the operational face of the cam member 22 is formed along the sliding direction of the shift fork member 17, such that a pivotal movement of the cam member 22 may bring the fork member 17 into the accelerated four-wheel drive position. Then, there is provided the link mechanism A for effecting together with in operative connection the positioning operation of the shift fork member 17 and the position-switching operation of the cam member 22.

Next, the operations of the above construction will be specifically described.

First, supposing the link mechanism A is currently at its second operational condition and if the cam member 22 is operated into the inoperative position inoperable on the shift fork member 17, this will automatically bring the vehicle into the standard four-wheel drive mode. Second, supposing the link mechanism A is currently at its first operational condition and if the cam member 22 is pivotably operated into the operative position, this pivotal movement of the cam member 22 causes the shift fork member 17 to slide into the accelerated four-speed drive position whereby the front wheels are driven in acceleration when the same are steered beyond a predetermined steering amount. Third, supposing the link mechanism is currently at its third operational condition and if the cam member 22 is maintained at the inoperative position and further if the shift fork member 17 is shifted into the two-wheel drive position, there is obtained the two-wheel drive mode where only the rear wheels are driven.

As described above, in the invention's construction, the three drive modes of accelerated four-wheel drive mode, standard four-wheel drive mode and the two-wheel drive mode may be selectively obtained only through a switching operation of the link mechanism A.

Furthermore, according to one preferred embodiment of the invention, if the switching operation of the link mechanism is effected by pivoting a mode-switch lever 24 about a horizontal axis P2, the three drive modes may be obtained by only pivotal operation of the mode-switch lever 24, whereby the operability of the four-wheel drive work vehicle will be further improved.

Moreover, according to another embodiment of the invention, if the cam member 22 is slidably splined on a switching operational shaft 21 which is coaxially connected with a pivot shaft of a pitman arm for steering the front wheels, it becomes possible to eliminate the cam mechanism, pivot arm, wire and so on required in the conventional construction. As the results, in this type of four-wheel work vehicle, the present invention has achieved simplification of the link construction between the pitman arm for steering the front wheels and the front-wheel change speed device thereby reducing the manufacturing costs of the entire system.

BRIEF DESCRIPTION OF THE DRAWINGS

Accompanying drawings illustrate preferred embodiments of a four-wheel drive work vehicle related to the present invention; in which.

DESCRIPTION OF THE PREFERRED EMBODIMENTS

Preferred embodiments of a four-wheel drive work vehicle related to the present invention will be particularly described next with reference to the accompanying drawings.

Figure 1:
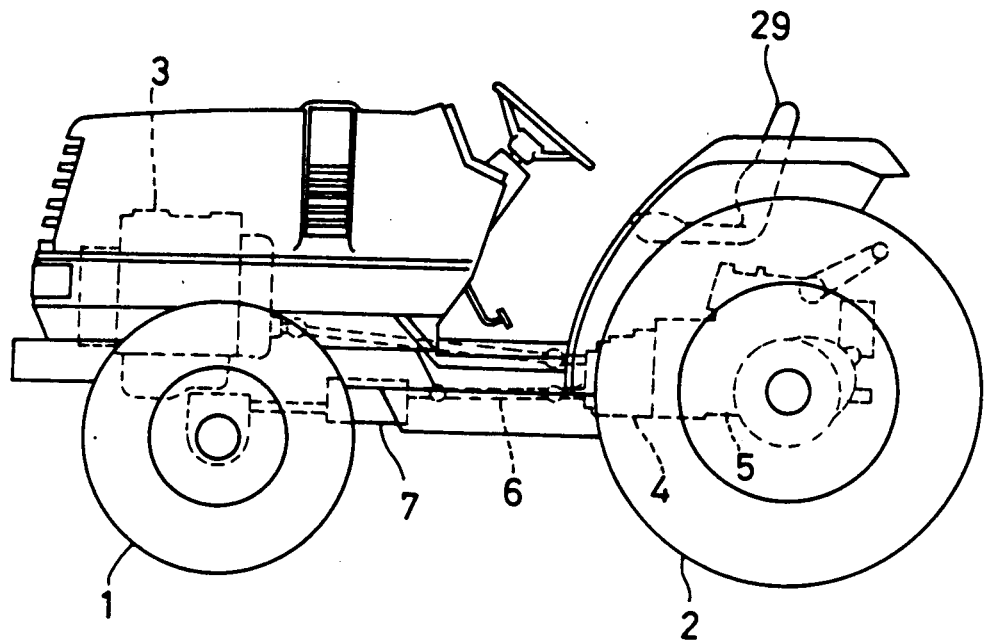
FIG. 1 is an overall side view of an agricultural tractor as one example of the four-wheel drive work vehicle of the invention.

As shown in FIG. 1, an agricultural tractor, as one example of the four-wheel drive work vehicle related to the invention, includes a vehicle body supported by a pair of front wheels 1 and a pair of rear wheels 2 and mounting an engine 3 at a front region thereof and a clutch 4 and a transmission casing 5 at rear regions thereof. The power from the engine 3 is transmitted via the clutch 4 to a main change-speed device and an auxiliary change-speed device both housed in the casing 5 to undergo a change-speed operation respectively therethrough to the rear wheels 2. Also, a power branched through the auxiliary change-speed device is transmitted via a front-wheel output shaft 6 to a front-wheel change speed device 7 mounted at another front region of the vehicle body to undergo a change-speed operation therethrough to consequently reach the front wheels 1.

Figure 2:
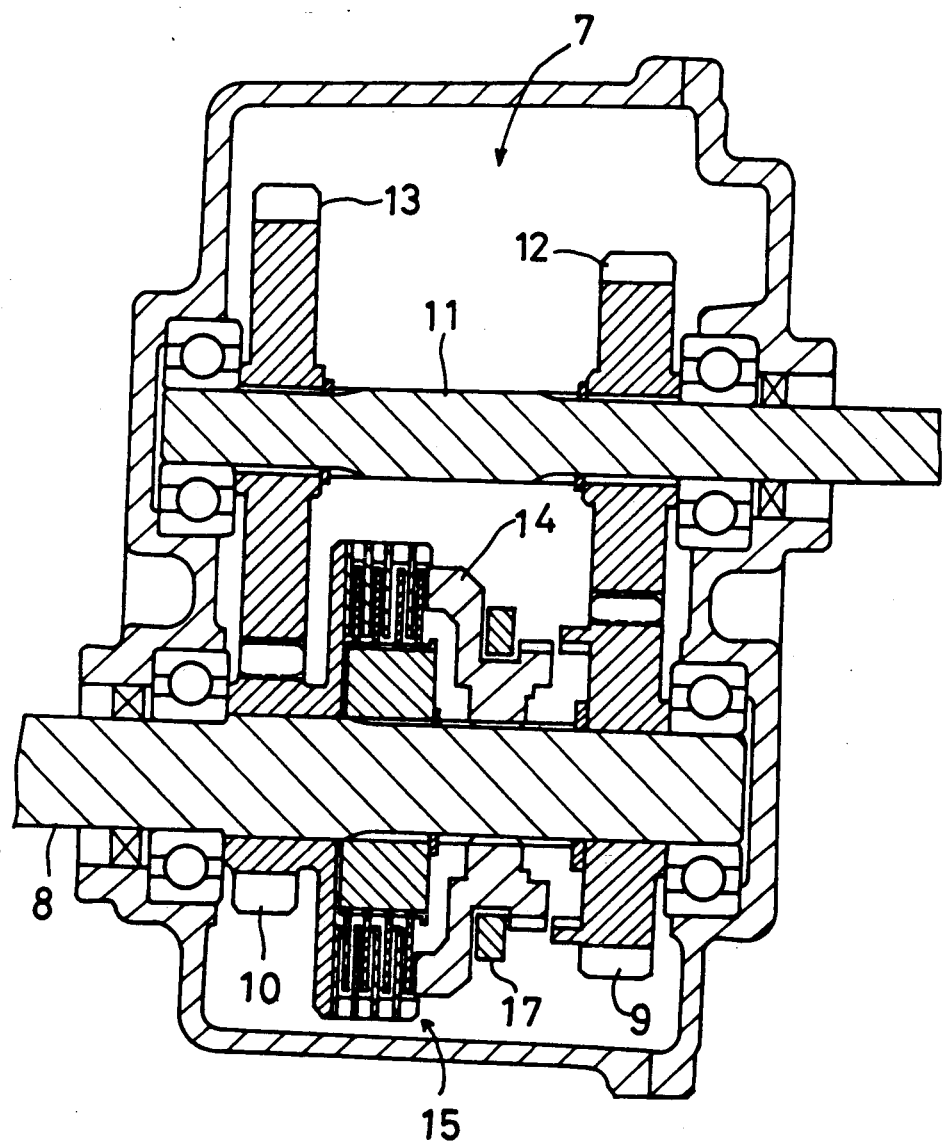
FIG. 2 is a side view in vertical section of a front-wheel change speed device.

Next, the construction of the front-wheels change-speed device 7 will be specifically described with reference to FIG. 2. As shown, an output shaft 8 for the front wheels 1 mounts thereon a standard-modxe input gear 9 and an accelerated-mode input gear 10, with the gears 9 and 10 being rotatable relative to each other. These input gears 9 and 10 mesh respectively with a standard-mode output gear 12 and an accelerated-mode output gear 13 both fixedly mounted on a transmission shaft 11 receiving power from the front-wheel output shaft 6. Further, a shift member 14 is slidably splined on the output shaft 8. In operation, if this shift member 14 is shifted into a standard four-wheel drive position to engage the standard-mode input gear 9, the power is transmitted in the same speed to the front wheels 1 and to the rear wheels 2. Conversely, if the shift member 14 is shifted into an accelerated four-wheel drive position to press-engage a friction clutch 15 disposed between the accelerated-mode input gear 10 and the output shaft 8, the power is transmitted at a higher speed to the front wheels 1 than to the rear wheels 2. Further, if the shift member 14 is placed at a two-wheel drive position free from its engagement with the standard-mode input gear 9 and free also from the operative connection with the friction clutch 15, no power is transmitted from the transmission shaft 11 to the output shaft 8.

Figure 3:
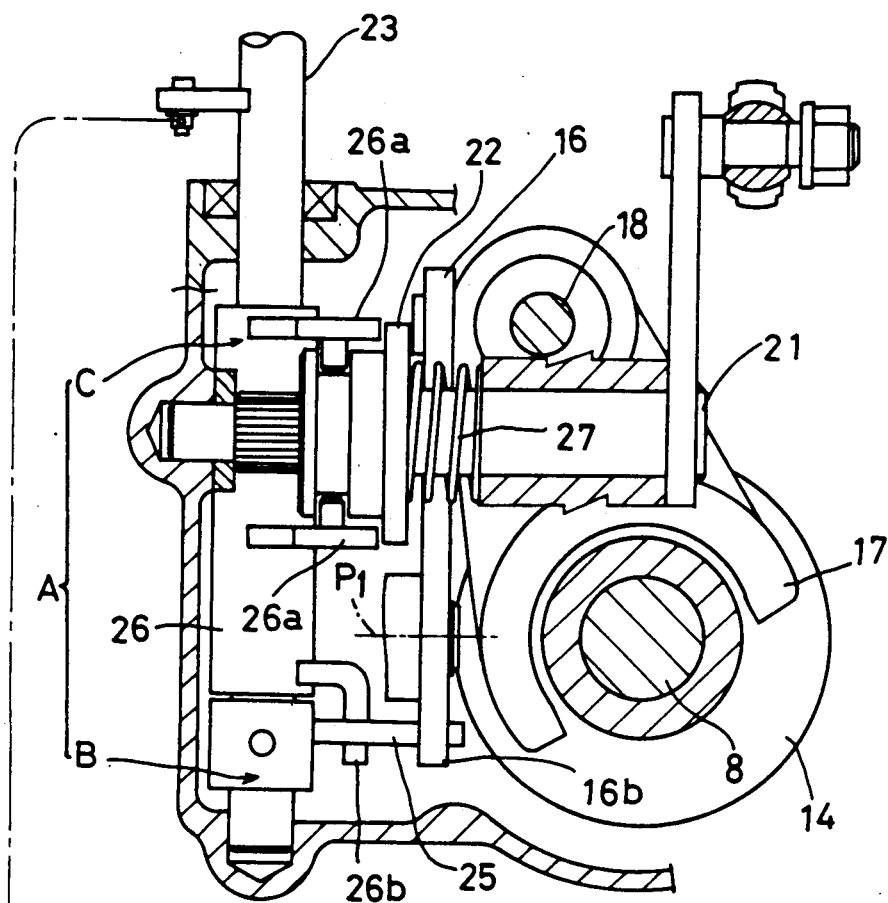
FIG. 3 is a back view showing a vicinity of a cam member at an accelerated four-wheel drive mode where front vehicle wheels are driven at a higher speed than rear wheels in response to a steering operation of the front wheels effected beyond a predetermined angle.
Figure 4:
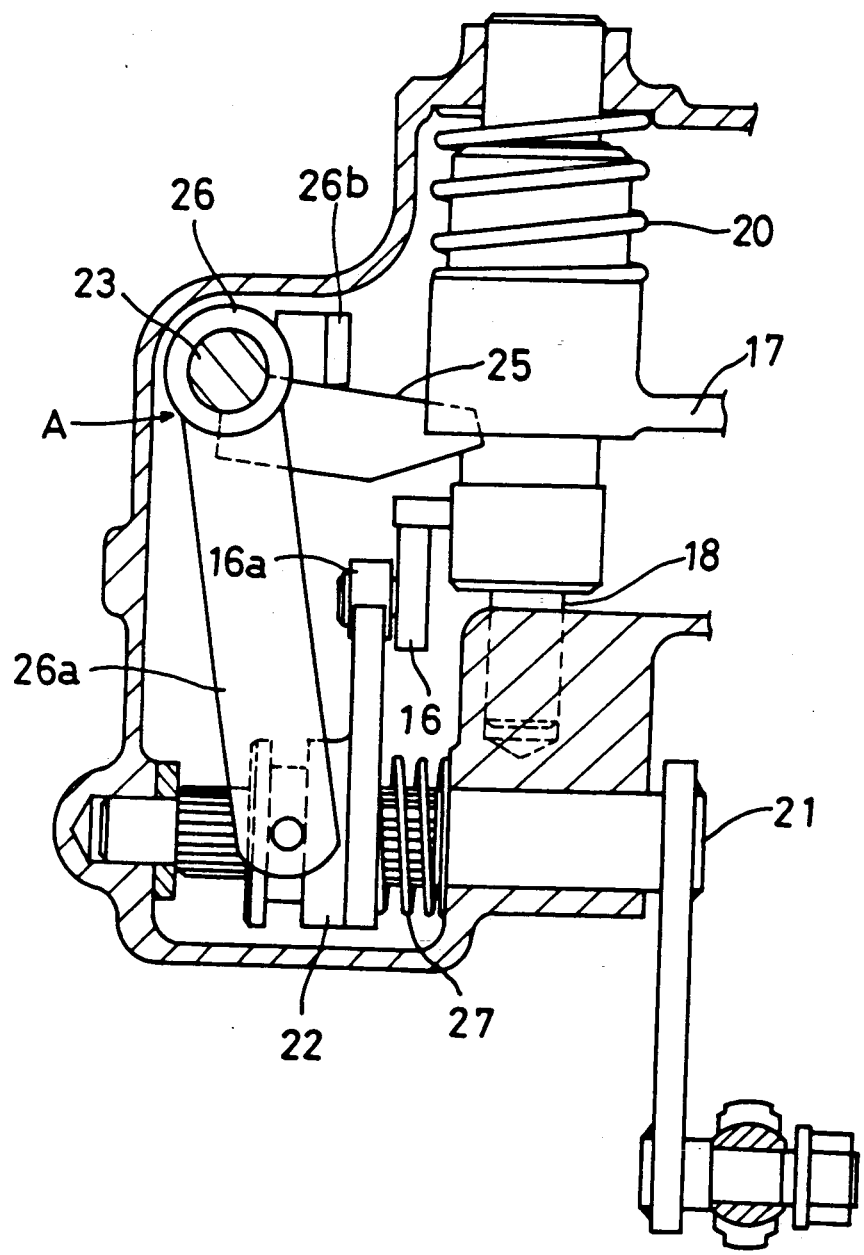
FIG. 4 is a plane view illustrating a vicinity of the cam member and a shift fork member at the accelerated four-wheel drive mode.
Figure 5:
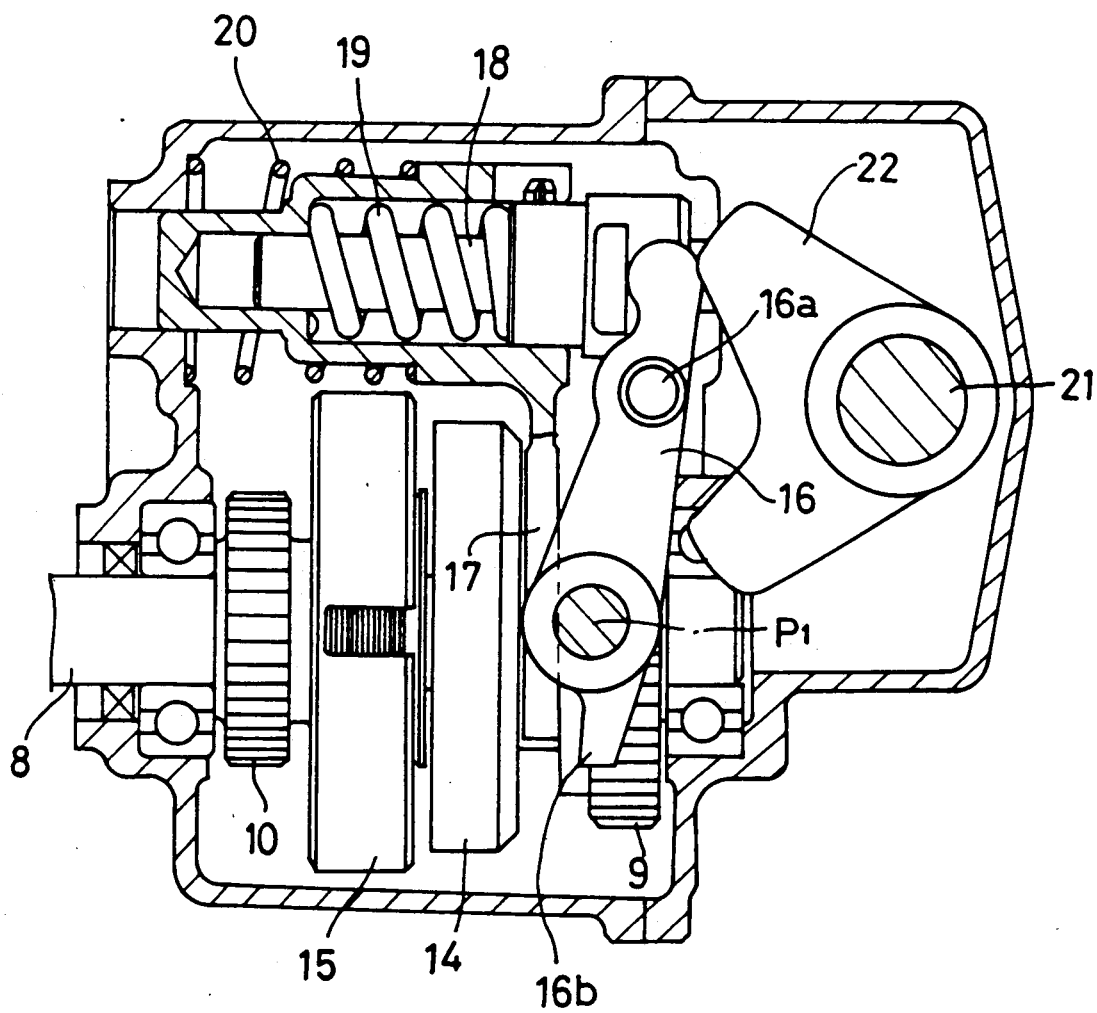
FIG. 5 is a side view illustrating a vicinity of the cam member and the shift fork member at the accelerated four-wheel drive mode.

Next, the operational construction of the shift member 14 will be described. As shown in FIGS. 3, 4 and 5, a shift fork 17 for the shift member 14 is fitted via a spring 19 on an axially slidable operational shaft 18, with the shift fork 17 being urged towards a standard four-wheel drive position for engagement with the standard-mode input gear 9 by means of a further spring 20 having an urging force weaker than the spring 19.

On the other hand, a switching operational shaft 21 is disposed normal to the operational shaft 18 and slidably splines thereon cam member 22. This cam member 22 pushes an operational arm 16 pivotably supported about a horizontal axis P1 for moving the operational shaft 18 and the shift fork member 17 to engage the friction clutch 15 for an accelerated four-wheel drive mode.

Next, there will be described a link mechanism A operatively connected to a mode-switch lever 24 for governing the operational condition of the front-wheel change speed device 7. This link mechanism A, as shown in FIGS. 3, 4 and 5, comprises a support-shaft mechanism B and a double-shaft mechanism C. The support-shaft mechanism B includes a support shaft 23 and a support-shaft arm portion 25. The support shaft 23 is supported rotatable and has one end thereof operatively connected via a link mechanism 28 to the mode-switch lever 24 pivotable about a horizontal axis P2 as shown in FIG. 3 and has the other end thereof fixed to the support-shaft arm portion 25. Further, on this support shaft 23, there is rotatably fitted a cylindrical shaft 26. This cylindrical shaft 26 together with a first arm 26a and a second arm 26b constitute the cylindrical-shaft mechanism C. More particularly, the cylindrical shaft 26 fixedly carries thereon the first arm 26a and the second arm 26b, with the first arm 26a engaging into a boss of the cam member 22 while the second arm 26b being engageable with the support arm portion 25 in connection with a position of the support shaft 23.

In FIGS. 3, 4 and 5, the mode-switch lever 24 is shown as operated into the accelerated four-wheel drive position 4WD—II while the link mechanism A is positioned at the first operational condition. As shown particularly in FIG. 4, the shift fork 17 is operated by the urging force of the spring 20 into the standard four-wheel drive position for engaging the standard-mode input gear 9. On the other hand, the cam member 22 will move by the urging force of the spring 27 away from a roller 16a of the operational arm 16 leftwards in FIG. 4 (i.e. move from the operative position to the inoperative position). This movement is transmitted to the cylindrical-shaft mechanism C; namely from the first arm 26a and the cylindrical shaft 26 to the second arm 26b. However, this movement is obstructed by the abutment of the second arm 26b against the support-shaft arm portion 25 of the support shaft 23. Accordingly, the cam member 22 is retained at its operative position for transmitting its pivotal movement to the roller 16a.

Now, the switching operational shaft 21 is operatively connected to a steering mechanism D of the front wheels 1, such that the switching operational shaft 21 is pivoted in operative connection with a steering operation of the front wheels 1. Then, if the front wheels are steered beyond a predetermined angle, the cam member 22 pushes the roller 16a of the operational arm 16 to pivot the operational arm 16 counterclockwise in FIG. 5. This counterclockwise pivotal motion of the arm 16 causes the shift fork member 17 and the shift member 14 to engage the friction clutch 15 for providing the accelerated four-wheel drive mode, whereby the front wheels 1 are driven in acceleration relative to the rear wheels 2.

Figure 6:
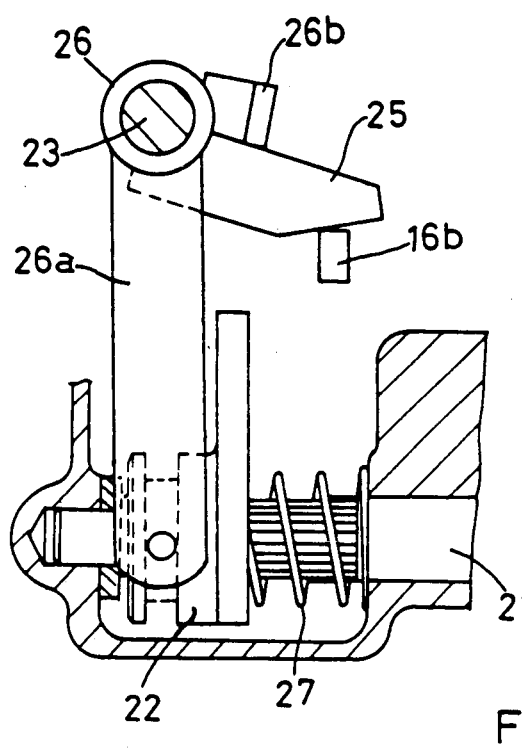
FIG. 6 is a plane view showing the vicinity of the cam member at a standard four-wheel drive mode where the front wheels and rear wheels are constantly driven at substantially the same speed irrespectively of amount of front-wheel steering operation.

If the mode-switch lever 24 is pivoted into the standard four-wheel drive position 4WD—I, this brings the link mechanism A into a second operational condition. In this second operational condition, as shown in FIGS. 3 and 6, the support shaft 23 is pivoted by a predetermined angle (clockwise in FIG. 6) and the cam member 22 is moved by the urging force of the spring 27 leftwards in FIG. 6 away from the roller 16a of the operational arm 16 (i.e. moves into the inoperative position). Meanwhile, the roller 16a of the arm 16 maintains its present position (the posture shown in FIG. 5) by the urging force of the spring 20. In this condition, even if the front wheels 1 are steered beyond a predetermined angle, the cam member 22 as placed in the inoperative position pivots without any engagement, whereby the operational arm 16 is not pivoted and the shift member 14 and the shift fork 17 are constantly maintained by the urging force of the spring 20 at the standard four-wheel drive position for engagement with the standard-mode input gear 9.

Figure 9:
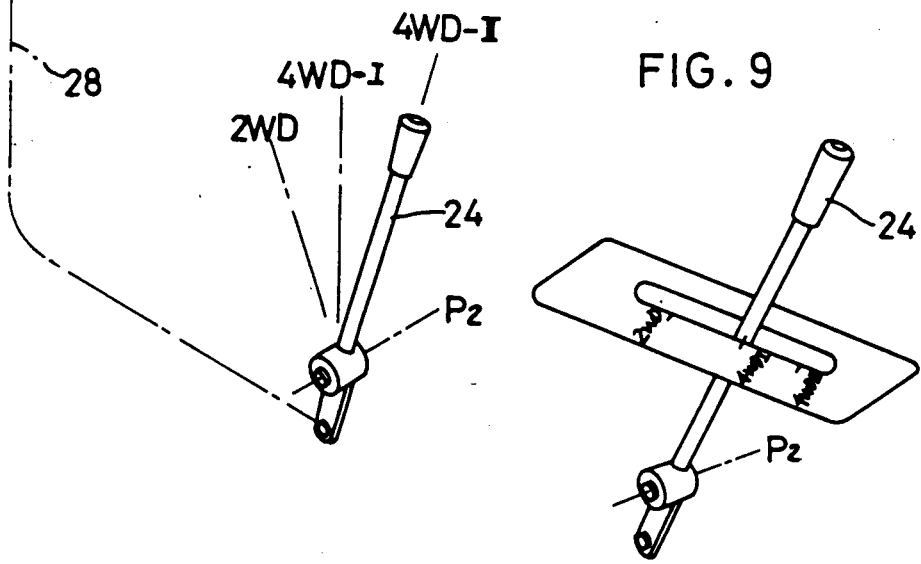
FIG. 9 is a view showing the vicinity of an operating portion of an operational lever.
Figure 7:
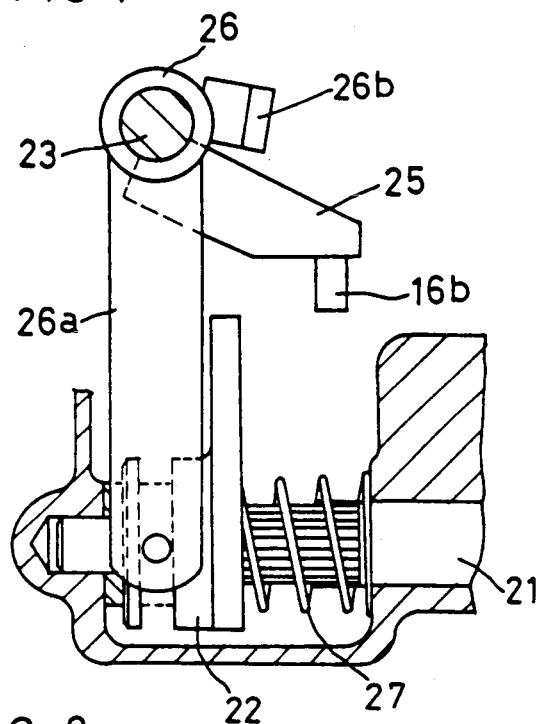
FIG. 7 is a plane view showing the vicinity of the cam member at a two-wheel drive mode where only the rear wheels are driven.
Figure 8:
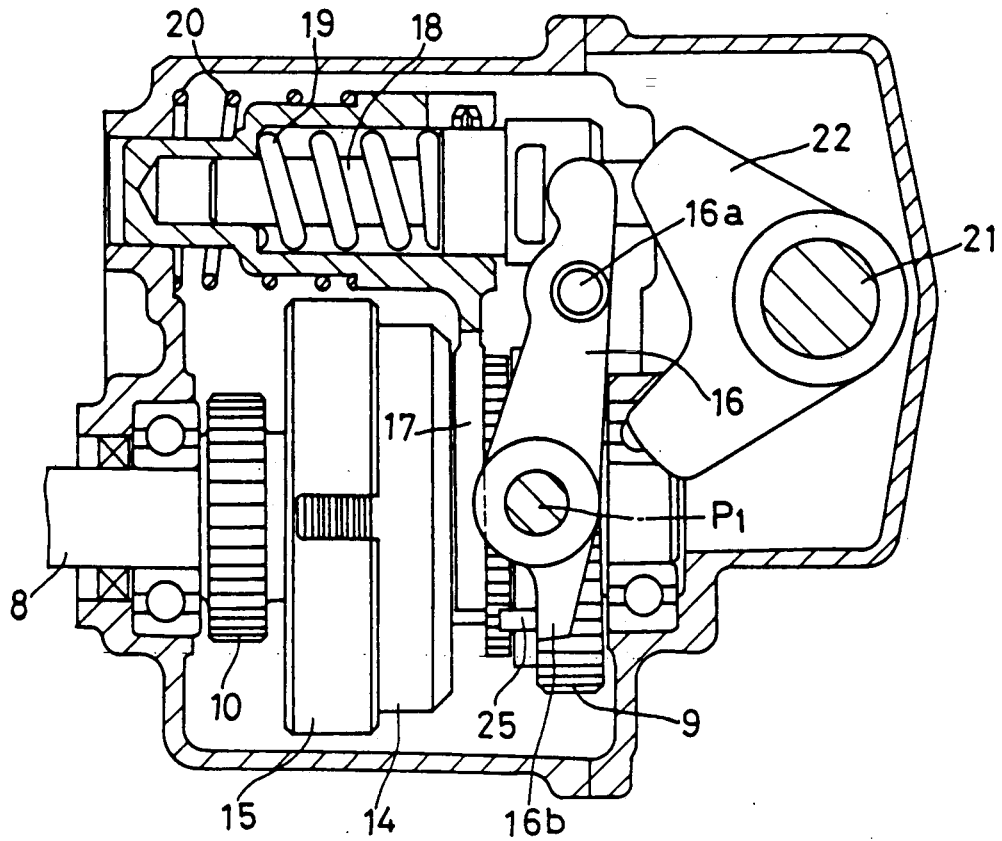
FIG. 8 is a side view showing the vicinity of the cam member and the shift fork member at the two-wheel drive mode.

If the mode-switch lever 24 is pivoted into a two-wheel drive position 2WD, this bring the link mechanism A into a third operational condition. In this condition, the support shaft 23 is further pivoted by a predetermined angle (clockwise in FIG. 7) and, as shown in FIGS. 3, 7 and 8, the support-shaft arm portion 25 of the support shaft 23 is brought into abutment against a lower end 16b of the operational arm 16 to pivot the arm 16 about the horizontal axis P1 (counterclockwise in FIG. 8). With this, the shift member 14 is moved via the shift fork 17 away from the standard-mode input gear 9 into a two-wheel drive position inoperable on the friction clutch 15. Then, by the pushing effect of the operational arm 16 and the urging force of the spring 20 towards the engagement with the standard-mode input gear 9, the shift member 14 is maintained at the two-wheel drive position to break power transmission to the front wheels 1. The vicinity of operating portions of the mode-switch lever 24 is shown in FIG. 9.

Figure 10:
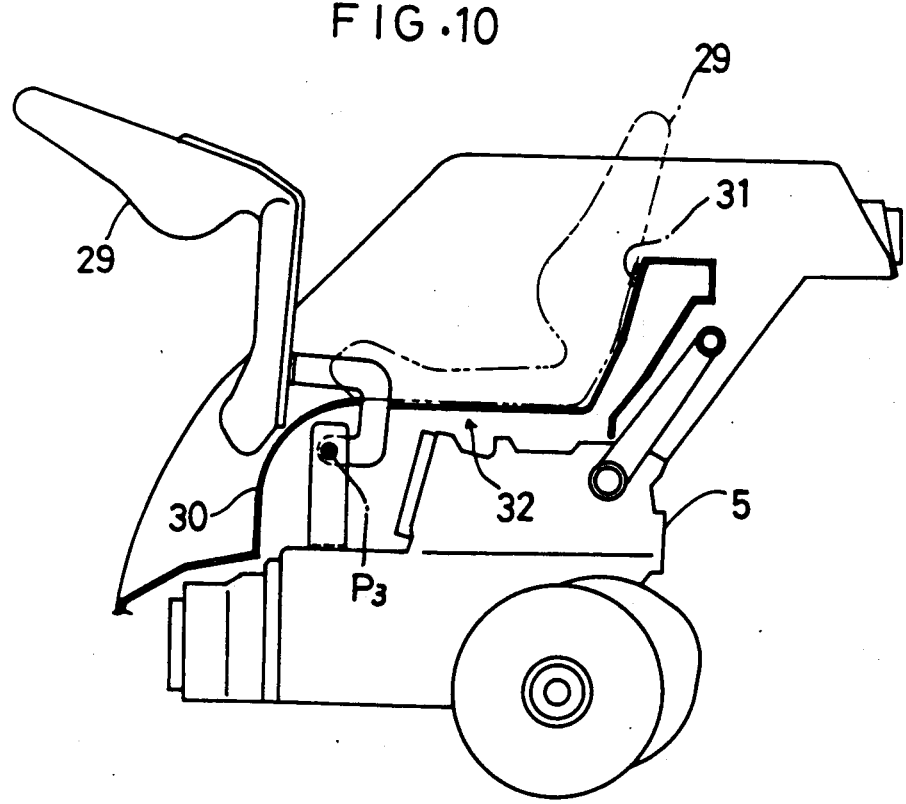
FIG. 10 is a side view showing vicinity of a driver's seat.

Further, as shown in FIG. 10, a driver's seat 29 is supported as pivotable about a horizontal axis P3 above the transmission casing 5, such that this driver's seat 29 may act also as an openable and closable lid for an opening 32 defined in a floor panel 30, with the outer periphery of the opening 32 being provided with a rubber packing 31 for sealing.

Figure 11:
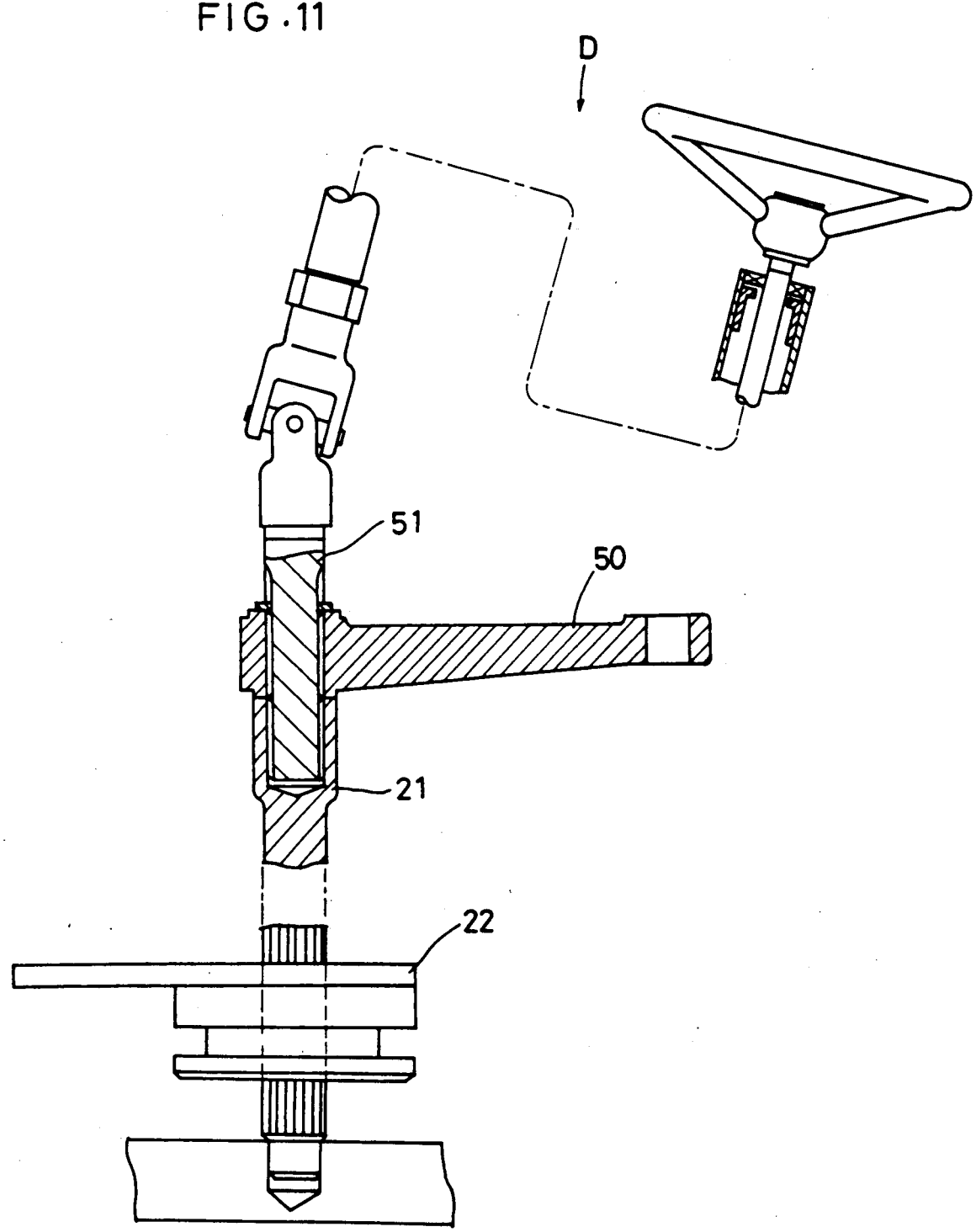
FIG. 11 is a view showing an interconnecting construction between a switching operational shaft and a steering mechanism according to a further embodiment of the present invention.

According to a further embodiment of the present invention, as shown in FIG. 11, if in the front-wheel change speed apparatus 7 the switching operational shaft 21 is disposed vertically relative to the vehicle body to be coaxially connected to a pivot shaft 51 of a pitman arm 50 for steering the front wheels 1, the connecting construction between the pitman arm 50 and the front-wheel change speed apparatus 7 may be formed more simply.

Incidentally, although reference marks and numerals are provided in the appended claims, it is to be understood that these marks and numerals are not to limit the scope of the invention to those constructions illustrated in the accompanying drawings.

What is claimed is:

1. A four-wheel drive work vehicle having a front-wheel drive change speed apparatus 7 selectively switchable by a sliding operation of a shift member 14 to provide a standard four-wheel drive mode for driving front wheels and rear wheels at substantially the same speed, an accelerated four-wheel drive mode for driving the front wheels at a higher speed than the rear wheels when the front wheels are steered beyond a predetermined angle, and a two-wheel drive mode for driving only the rear wheels while breaking the power transmission to the front wheels, wherein the front-wheel change speed apparatus 7 comprises:

a shift fork member 17 operatively connected to the shift member 14 and constantly biased toward a standard four-wheel drive position, the shift fork member 17 being linearly shiftable from the four-wheel drive position to a two-wheel drive position or to an accelerated four-wheel drive position;

a cam member 22 operatively connected to a steering wheel and having an operational face formed along the sliding direction of the shift fork member 17, the cam member 22 being operable into one of (1)

an operable position for selectively pushing the shift fork member 17 via an operational arm 16 from the standard four-wheel drive position to the accelerated four-wheel drive position and (2) an inoperative position free from the operative connection to the shift fork member 17; and a link mechanism A switchable into a first operational condition for bringing the cam member 22 into the operative position, a second operational condition for bringing the cam member 22 into the inoperative position and a third operational condition for bringing the cam member 22 into the inoperative position and the shift fork member 17 into the two-wheel position respectively, wherein the link mechanism A is switchable by pivoting a mode-switch lever 24 about a horizontal axis P2, the link mechanism A comprising:

a support-shaft mechanism B having a support shaft 23 pivotably operated by the mode-switch lever 24; and a support-shaft arm 25 fixedly secured to the support shaft 23, and a cylindrical-shaft mechanism C including a cylindrical shaft 26 pivotably fitted on the support shaft 23 and having a first arm 26a for switching over the position of the cam member 22 and a second arm 26b engageable with the support arm portion 25 for positioning the first arm 26a;

wherein an operation of the mode-switch lever 24 causes the link mechanism A to switch over the cam member 22 between the operative position and the inoperative position via the support-shaft arm portion 25 and the cylindrical-shaft mechanism C, and positioning the shift fork member 17 at the two-wheel drive position via the operational arm 16.

2. A four-wheel drive work vehicle having a front-wheel drive change speed apparatus 7 selectively switchable by a sliding operation of a shift member 14 between a standard four-wheel drive mode for driving front wheels and rear wheels at substantially the same speed, an accelerated four-wheel drive mode for driving the front wheels at a higher speed than the rear wheels when the front wheels are steered beyond a predetermined angle, and a two-wheel drive mode for driving only the rear wheels while breaking the power transmission to the front wheels, wherein the front-wheel change speed apparatus 7 comprises:

a shift fork member 17 operatively connected to the shift member 14 and constantly biased toward a standard four-wheel drive position, the shift fork member 17 being linearly shiftable from the four-wheel drive position to a two-wheel drive position and to an accelerated four-wheel drive position;

a mode-switch lever 24 pivotable about a first horizontal axis P2 and operable in a linear path to an accelerated four-wheel drive corresponding position, a standard four-wheel corresponding position, and a two-wheel drive corresponding position;

an operational arm 16 having an intermediate portion pivotably supported on a second horizontal axis P1 perpendicular to and spaced from a sliding direction of the shift fork member 17, an operational portion at one end thereof for pushing the shift fork member 17, and a third portion at a second end thereof;

a cam member 22 operatively connected to a steering wheel and switchable between an operative position for pushing the operational portion of the operational arm 16 toward the sliding direction of the shift fork member 17 and an inoperative position; and a link mechanism A, operated by the mode-switch lever 24, for (1) bringing the cam member 22 to the operative position in the accelerated four-wheel drive corresponding position of the mode-switch lever 24, (2) bringing the cam member 22 to the inoperative position in the standard four-wheel drive corresponding position of the mode-switch lever 24, and (3) pushing the third portion of the operational arm 16 in a direction opposite to the sliding direction of the shift fork member 17, thereby bringing the shift member 17 to the two-wheel drive position in the two-wheel drive corresponding position of the mode-switch lever 24, the link mechanism A comprising a support-shaft mechanism B having a support shaft 23 pivotably operated by the mode-switch lever 24, and a support-shaft arm portion 25 fixedly secured to the support shaft 23, and a cylindrical-shaft mechanism C including a cylindrical shaft 26 pivotably fitted on the support shaft 23 and having a first arm 26a for switching over the position of the cam member 22 and a second arm 26b engageable with the support-arm portion 25 for positioning the first arm 26a, the first arm 26a and the second arm 26b being fixed to the cylindrical shaft 26, wherein, the link mechanism A switches over the cam member 22 between the operative position and the inoperative position via the support-shaft arm portion 25 and the cylindrical-shaft mechanism C by operating the mode-switch lever 24 to allow the support-shaft arm portion 25 to position the shift fork member 17 at the two-wheel drive position via the operational arm 16.

3. A four-wheel drive work vehicle of claim 2, wherein the cam member 22 is slidably splined on a switching operational shaft 21, with the switching operational shaft 21 being coaxially connected with a pivot shaft of a pitman arm for steering the front wheels.

* * * * *